United States Patent
Hilpert

(12)
(10) Patent No.: US 9,192,143 B2
(45) Date of Patent: Nov. 24, 2015

(54) REINFORCED EAR LOOP

(75) Inventor: Jean Jacques Hilpert, Vitré (FR)

(73) Assignee: ALL FLEX EUROPE SAS, Vitre (FR)

( * ) Notice: Subject to any disclaimer, the term of this patent is extended or adjusted under 35 U.S.C. 154(b) by 167 days.

(21) Appl. No.: 12/595,710

(22) PCT Filed: Apr. 10, 2008

(86) PCT No.: PCT/FR2008/000498
§ 371 (c)(1),
(2), (4) Date: Jan. 15, 2010

(87) PCT Pub. No.: WO2008/142277
PCT Pub. Date: Nov. 27, 2008

(65) Prior Publication Data
US 2010/0132233 A1    Jun. 3, 2010

(30) Foreign Application Priority Data
Apr. 13, 2007  (FR) ..................................... 07 02687

(51) Int. Cl.
*A01K 11/00*  (2006.01)

(52) U.S. Cl.
CPC ..................................... *A01K 11/001* (2013.01)

(58) Field of Classification Search
USPC ............. 40/302, 301; 24/704.1, 704.2, 706.3, 24/682.1, 688, 692
See application file for complete search history.

(56) References Cited

U.S. PATENT DOCUMENTS

| | | | | |
|---|---|---|---|---|
| 1,942,171 A | * | 1/1934 | Janes | 24/688 |
| 4,597,208 A | | 7/1986 | Chevillot | |
| 4,761,863 A | * | 8/1988 | Sugihara | 24/692 |
| 5,979,095 A | * | 11/1999 | Schneider et al. | 40/633 |
| 6,385,877 B1 | * | 5/2002 | Wikan | 40/301 |
| 6,666,170 B1 | * | 12/2003 | Hilpert | 119/814 |
| 6,708,432 B2 | * | 3/2004 | Haar et al. | 40/301 |
| 7,360,718 B2 | * | 4/2008 | Yeh et al. | 239/204 |
| 2004/0079010 A1 | * | 4/2004 | Crespo | 40/301 |
| 2008/0047177 A1 | * | 2/2008 | Hilpert | 40/301 |

FOREIGN PATENT DOCUMENTS

| | | |
|---|---|---|
| EP | 0 056 533 | 7/1982 |
| FR | 2 550 915 | 3/1985 |
| GB | 2 139 156 | 11/1984 |
| WO | 99/29167 | 6/1999 |

\* cited by examiner

*Primary Examiner* — Charles A Fox
*Assistant Examiner* — Christopher E Veraa
(74) *Attorney, Agent, or Firm* — Young & Thompson

(57) ABSTRACT

The invention relates to a cattle marking and identification ear tag of the type that combines a male part and a female part, including a tag (2) and an essentially cylindrical or frusto-conical button (3) which is secured to an eyelet (4) in the tag, such that the base (5) of the button abuts against the edge of the eyelet, the contact surfaces having a complementary shape. The ear tag is characterized in that the base of the button includes at least one reinforcing rib (6). The button is provided with reinforcing elements such that the tag cannot be detached from the button at the eyelet using a cutting instrument without leaving visible traces of attempted forgery of the tag.

18 Claims, 3 Drawing Sheets

REINFORCED EAR LOOP

BACKGROUND OF THE INVENTION

This invention relates to a loop for marking and identifying livestock and other animals, of the type that is designed to be attached to one of the ears of the animal.

The object of the invention is an ear loop of the type that combines a male part and a female part comprising a tag that is attached to a button by an eyelet, in which the button is equipped with reinforcement elements so that the tag cannot be detached from the button at the eyelet by a sharp-edged instrument without leaving obvious traces indicating an attempt to falsify the tag.

The identification of farm animals was made mandatory in numerous countries to ensure the sanitary monitoring of livestock and to guarantee the origin and quality of the meat offered to consumers. The mark generally comprises an identification number inscribed on a tag that is attached to the ear of the animal, which makes it possible to track it throughout its existence. The crisis due to Mad Cow Disease increased the importance of ensuring the effectiveness and the reliability of the marking system used.

The ear marks made of plastic are currently the most used. They comprise an attachment loop that carries a tag on which all of the legal data are noted, whereby this loop constitutes the female part of the mark and works with a male part to lock the overall structure, on which the identification number is also inscribed. They are designed to be placed irreversibly, using an unbreakable attachment system, for example a receiving button that is combined with a punch by irreversible interlocking. The tags are provided with conventional and indelible markings. Numerous variants have been proposed whose purpose is to improve the solidity and the unbreakability of the attachment system of the loop.

One of the most effective variants is carried out using a loop whose female part is formed by three parts: a cap that is thus named because of its shape, a spring, and a tag. The tag comprises an eyelet through which the cylinder of the cap passes, while the collar at the base of the cap forms an enlarged base that abuts the edges of the ring. The collar of the cap and the tag are joined by gluing, welding, or another known technique that makes it possible to combine them in an irremovable manner. The spring, placed below the cap, receives the male part by thus locking the unit on the animal's ear.

Although this system, or others of the same type, is provided with numerous safety elements, it has been pointed out that it was also possible for conmen to falsify the tags. Actually, it has been noted that by cutting the cap using a sharp-edged tool so as to separate the ring from the tag and to detach the collar all around the cylinder, it was possible to remove the tag from the loop and then to replace it after having modified it, without the cut leaving any trace that would attract the farmer's attention.

It therefore appeared essential to propose a new form of ear tag, making it possible to respond to this risk without interfering with the facility of placement and without increasing the manufacturing costs. One of the problems that is encountered resides in the necessity of being able to visually monitor the state of the button, so as to ensure that it is neither damaged nor altered. The latter case is particularly important if it is necessary to carry out an assessment to detect an attempt at fraud. The known buttons do not meet this requirement.

In addition, the mechanical strength of the assembly of elements should not suffer as a result of the adopted solution so as to be able to ensure that the loop cannot be adversely affected during normal, often aggressive use, for example because of rubbing on vegetation that can lead to the detachment of the tag.

SUMMARY OF THE INVENTION

The purpose of this invention is to prevent the drawbacks above by making it possible to produce small loops with high solidity, preventing any fraud without complicating either its manufacturing or its use.

More specifically, the object of this invention is an ear loop for marking and identifying livestock, of the type that combines a male part and a female part, whereby the former comprises a tag and an essentially cylindrical or tapered button that is secured with an eyelet that is made in the tag such that the base of the button abuts the edge of the eyelet, whereby the contact surfaces assume complementary shapes, and whereby said loop is characterized in that the base of the button comprises at least one reinforcement rib.

The male part can work with the female part according to any method known in technology, for example using a punch that penetrates the central cavity of a receiving button. A part that acts as a spring can be provided under the button to facilitate the penetration and the blocking of the punch.

The tag is generally a small plate on which all of the legal data are noted by printing, engraving, bar code or other means known to one skilled in the art. Also in a known manner, it comprises a hole or an eyelet, receiving the button.

The button assumes an essentially cylindrical or tapered shape, whereby its base can be wider than its top, which facilitates the insertion of the button into the eyelet of the tag up to a stop position before attachment. In some models, the base of the button can also comprise a circular collar that is perpendicular to the axis of the button, against which the eyelet can also rest. The button is secured with the eyelet that is made in the tag so that the base of the button rests against the edge of the eyelet, at the widest part of the base of the button or else at the collar. In all of the cases, it is recommended that the surfaces placed opposite assume complementary shapes promoting their contact. Actually, the contact zone between the eyelet and the button makes it possible to attach them, for example by gluing or by welding by ultrasound. Any other means of assembly, such as clamping, can also be used if it meets the solidity requirement.

In the ear loop according to the invention, the base of the button comprises at least one reinforcement rib. This rib imparts a relief to the contact interface of the eyelet and the button, which impedes the insertion of a blade or other sharp-edged instrument. The effort to be put forth to overcome the roughness encountered by the blade is then too great for it to be able to advance further by manual pressure alone, except by tilting it to find support and lifting it, or to restart the cut multiple times. This inevitably leads to imposing traces such as scrapes or deformations on the button, whereby these deteriorations are then visible to the naked eye. Said at least one rib can be manufactured by one of the techniques that is available to one skilled in the art. In a known manner, it can be cast or assembled by gluing or by welding by ultrasound.

The reinforcement rib according to the invention can assume varied shapes and orientations. It can consist of a circular thread in relief all around the base of the button. In contrast, it can be oriented longitudinally relative to the axis of the button, i.e., perpendicularly to the plane of the button base. Thus, according to a special characteristic of the ear loop that is the object of the invention, said at least one reinforcement rib is arranged longitudinally relative to the axis of the button.

In a preferred embodiment of the ear loop according to the invention, the base of the button comprises a number of reinforcement ribs that are arranged according to symmetry of revolution relative to the axis of the button.

According to an advantageous characteristic of the invention, said at least one rib has a height that is less than or equal to the thickness of the eyelet of the tag. The ribs are thus placed at the interface of the eyelet and the button, without going above the plane of the tag, such that they are fully integrated and do not create any undesirable roughness on the surface of the tag.

According to a preferred characteristic of the invention, said at least one rib extends into the thickness of the eyelet so that it is at least partially flush with the surface of the eyelet. The flush part advantageously has the same curve as the eyelet so as not to create any undesirable roughness. It is easily understood that at each rib, the eyelet has a window that allows the rib to appear.

The ribs are thus partially visible when the tag is in place on the animal's ear, all the better if care is taken to make them in a color that is different from the shade of the tag. It is then easy to monitor the good condition of the loop with a simple glance. Thus, according to an advantageous characteristic, said at least one rib and the tag can have different colors.

In the ear loop according to the invention, the button, at its base, can comprise a circular collar that extends into a plane that is perpendicular to the axis of the button and that forms a stop to the lower edge of the eyelet, collar on which said at least one rib is seated. The collar combined with the ribs thus constitutes a reinforced structure and an additional barrier against any attempt at cutting between the tag and the button. In this case, preferably, the eyelet at least partially covers the collar and said at least one rib.

According to another characteristic of the ear loop according to the invention, the button, at its base, comprises a shoulder that forms a circular buttress, against which said at least one rib rests. The increased thickness that is thus created also reinforces the solidity of the base of the button and its resistance to possible damage.

According to a particular embodiment of the ear loop according to the invention, the eyelet comprises a circular rim that partially covers the shoulder forming the buttress of the button.

According to another advantageous embodiment of the ear loop according to the invention, the button is made of hard plastic, and the tag is made of flexible plastic. As already indicated, the use of materials of different colors allows an instantaneous visual monitoring of the condition of the loop.

Any attempt to separate the body of the button from the remainder of the device, and in particular from the tag with its eyelet so as to falsify said tag before replacing it, thus runs into the obstacle of making a cut around the button without degrading the adjacent elements and without leaving obvious traces. The reinforcement ribs according to the invention make it possible to enhance this obstacle so that the fraud will always be detected unless the deterrent effect acts as a preventive.

BRIEF DESCRIPTION OF THE DRAWINGS

Other advantages and characteristics of the invention will emerge from reading the description below of an embodiment that is provided by way of non-limiting example, illustrated by the accompanying drawings, in which.

DETAILED DESCRIPTION OF THE PREFERRED EMBODIMENTS

Figure 1:
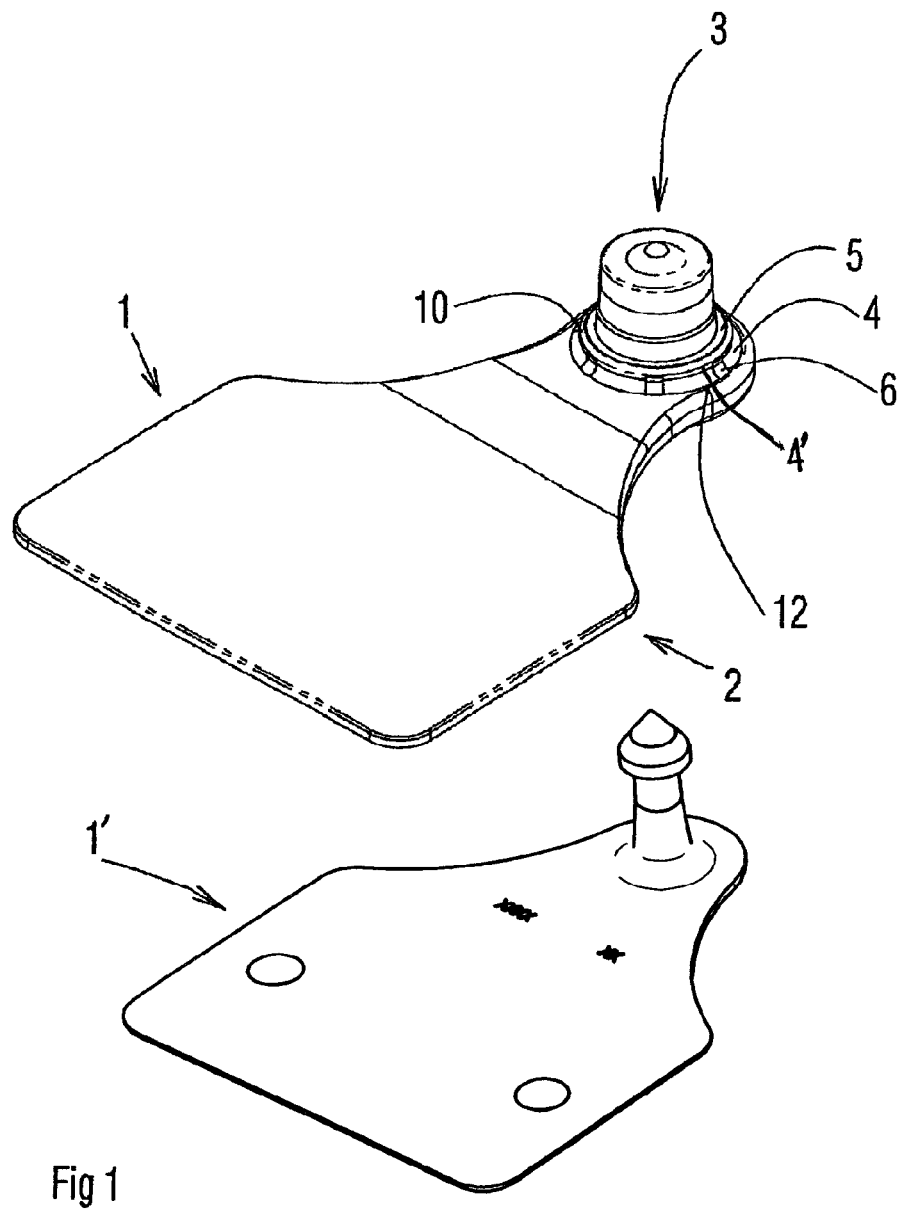
FIG. 1 is a perspective view of an ear loop according to the invention that shows the assembly of a button and a tag.
Figure 2:
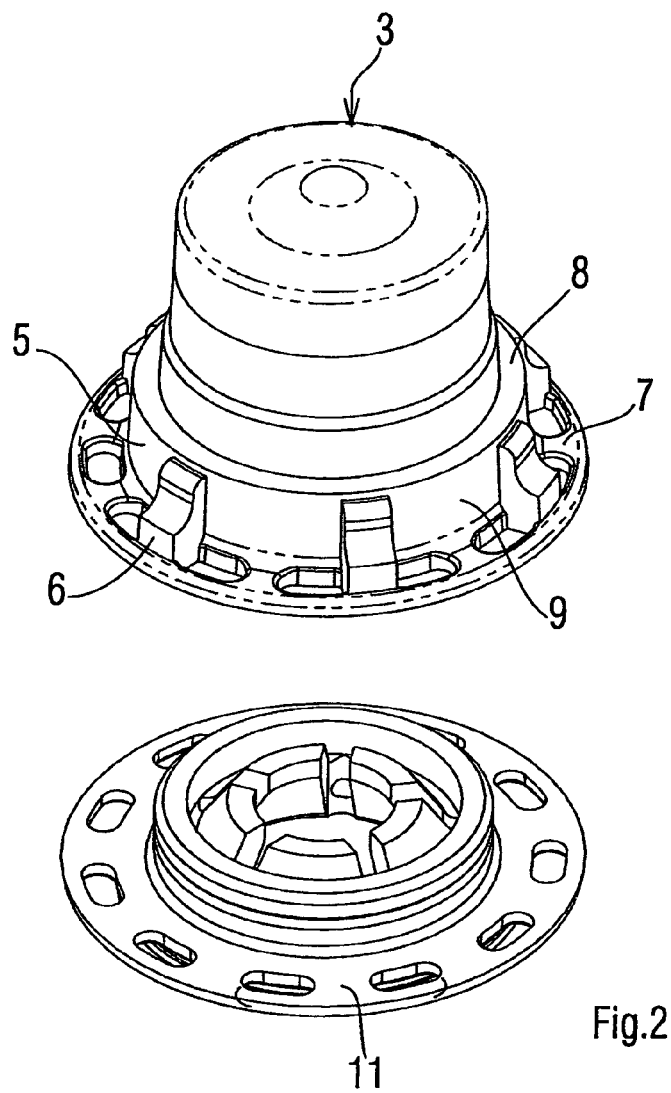
FIG. 2 is an exploded perspective view of the button and the associated spring.
Figure 3:
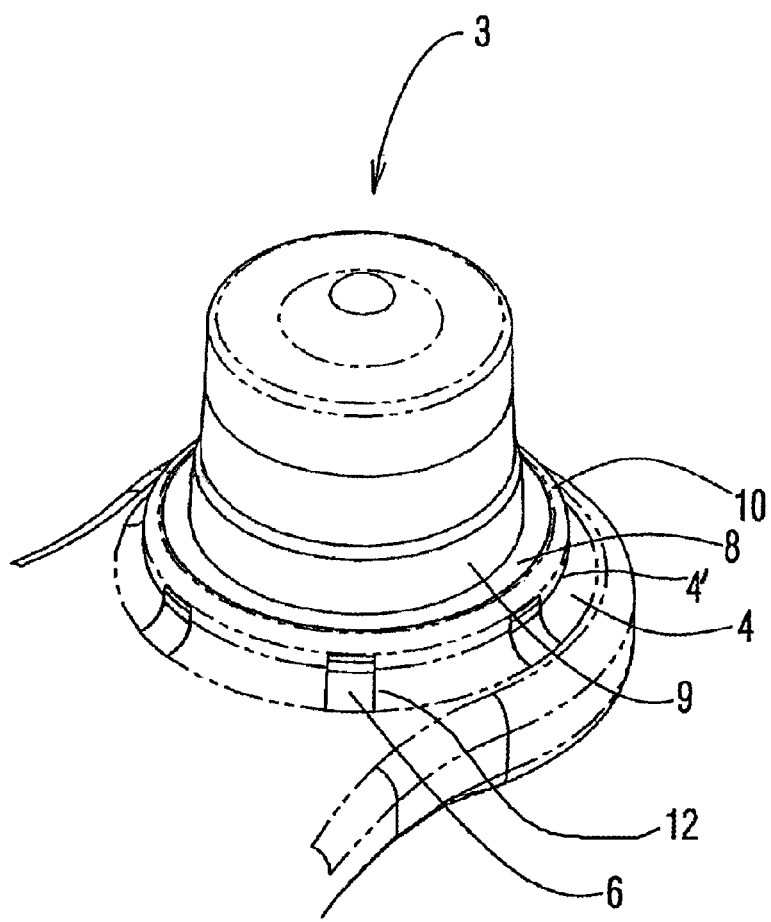
FIG. 3 is a partial perspective view of the ear loop as shown in FIG. 1.

The ear loop according to the invention consists of a male part 1' and a female part 1 that comprises the tag 2 and the button 3. The spring 11, placed under the button 3, facilitates the penetration and the locking of the male part in the central cavity of the button. The tag 2 is a small plate on which all of the legal data are noted. It comprises a hole that forms the eyelet 4, receiving the button 3.

The button 3 is tapered, slightly more flared at its base. It is secured with the eyelet 4 that is made in the tag 2 so that the base 5 of the button abuts against the inside edge 4' of the eyelet. The base of the button comprises the circular collar 7 that is perpendicular to the axis of the button 3, against which the eyelet 4 also abuts on its lower edge. The contact surfaces assume complementary shapes that makes possible, on the one hand, their assembly, and, on the other hand, an effective attachment. Their attachment has been ensured here by an ultrasonic welding.

At the base 5 of the button 3, the loop comprises a number of reinforcement ribs 6, in the case in question eight ribs. The ribs 6 are arranged longitudinally relative to the axis of the button 3 and according to a symmetry of revolution relative to the axis of said button. They extend into the thickness of the eyelet 4 at a height that is equal to the thickness of the eyelet 4 of the tag 2, so that they are flush with the same curve as the eyelet in their upper part, without exceeding the plane of the tag 2. They are thus fully integrated and create no undesirable roughness at the surface of the tag. It is easily understood that at each rib 6, the eyelet 4 has a window 12 that allows the rib to appear. The ribs 6 are thus partially visible when the tag is in place, especially as the ribs 6 and the tag 2 are manufactured in materials of different colors. The ribs 6 and the button 3 are also made in different shades, which easily allows the casting technique.

In the ear loop as shown here, the circular collar 7 at the base of the button 3 constitutes a stop for the lower edge of the eyelet 4. It also constitutes a foundation for the ribs 6, whereby this combination also reinforces the device against any attempt at cutting between the tag and the button. In this case, the eyelet 2 totally covers the collar 7 and partially covers the ribs 6.

According to another characteristic of the ear loop according to the invention, the button 3, at its base, comprises the shoulder 8 that forms the circular buttress 9, against which the ribs 6 rest. The thus created thickness increases the solidity of the button and its resistance to possible damage. The eyelet 4 comprises the circular rim 10 that partially covers the shoulder 8 of the button 3.

The three parts that have just been described in detail, namely the tag 2, the button 3, and the spring 11, are mounted together during manufacturing and constitute the complete female part of an ear loop according to the invention. It is well understood that such a loop can incorporate other characteristics that are intended to provide various additional advantages to the user.

The invention claimed is:

1. A plastic ear loop for marking and identifying livestock that combines a male part (1') and a female part (1), the female part comprising:

a tag (2);

a spring part (11); and a button (3) that is one of cylindrical and tapered, said button (3) comprising a base (5) and a top that delimit an internal cavity with an opening at a bottom of the button (3), said button (3) further comprising a shoulder (8) at the base (5) that defines an exterior buttress (9) at the bottom of the button (3) having greater thickness than a remainder of the base (5) of the button (3), an exterior surface of the base (5) at the buttress (9) comprising at least one reinforcement rib (6) extending from an exterior thickness of the button (3), the tag (2) having a hole that defines an eyelet (4) formed therein, the tag (2), the button (3), and the spring (11) being mounted together at the eyelet (4) of the tag (2), the button (3) fitted through the eyelet (4) so that the top of the button (3) extends out from the eyelet (4) and the base of the button (3) abuts against an inside edge (4') of the eyelet, the spring part (11) mounted under the button (3) and covering the opening at the bottom of the button (3), a top portion of the eyelet (4) comprising a circular rim (10) extending upward from a surface of the tag and covering the base (5) of the button (3), wherein the button is made of a first material, and the tag is made of a second material different from the first material.

2. The ear loop according to claim 1, wherein said at least one reinforcement rib (6) is arranged longitudinally relative to an axis of the button (3).

3. The ear loop according to claim 1, wherein the base (5) of the button (3) comprises a plurality of reinforcement ribs (6) arranged according to symmetry of revolution relative to an axis of said button.

4. The ear loop according to claim 2, wherein the base (5) of the button (3) comprises a plurality of reinforcement ribs (6) that are arranged according to symmetry of revolution relative to an axis of said button.

5. The ear loop according to claim 1, wherein said at least one rib (6) has a height that is less than or equal to a thickness of the eyelet (4) of the tag (2).

6. The ear loop according to claim 1, wherein said at least one rib (6) extends into a thickness of the eyelet (4) so that said at least one rib (6) is at least partially flush with a surface of the eyelet (4).

7. The ear loop according to claim 1, wherein the base (5) of the button (3) comprises a circular collar (7) that extends in a plane perpendicular to an axis of said button and on which said at least one rib (6) is seated, said circular collar (7) forming a stop at a lower edge of the eyelet (4).

8. The ear loop according to claim 7, wherein the eyelet (4) at least partially covers the collar (7) and said at least one rib (6).

9. The ear loop according to claim 1, wherein the first material of the button (3) is made of a hard plastic, and the second material of the tag (2) is made of flexible plastic more flexible than the first material.

10. The ear loop according to claim 1, wherein said at least one rib (6) and the tag (2) are of different colors.

11. The ear loop according to claim 1, wherein the spring part (11) comprises an outer portion surrounding a cavity, the outer portion having members extending inward into the cavity.

12. The ear loop according to claim 1, wherein a plurality of said at least one reinforcement rib (6) are located on an outer curved surface of the button (3) and project radially from the outer curved surface.

13. The ear loop according to claim 12, wherein said at least one reinforcement rib (6) is located on the outer curved surface of the button and extends longitudinally in a direction of a central axis of the button (3).

14. The ear loop according to claim 2, wherein the spring part (11) comprises an outer portion surrounding a cavity, the outer portion having members extending inward into the cavity.

15. The ear loop according to claim 12, wherein the spring part (11) comprises an outer portion surrounding a cavity, the outer portion having members extending inward into the cavity.

16. The ear loop according to claim 15, wherein the base (5) of the button (3) comprises a plurality of reinforcement ribs (6) located on an outer surface of the button, and wherein the eyelet (4) comprises a plurality of windows (12) extending through a thickness of the eyelet (4), each window (12) positioned about the circumference of the eyelet (4) to receive one of the reinforcement ribs (6) through the thickness of the eyelet (4).

17. The ear loop according to claim 16, wherein the base (5) of the button (3) comprises a circular collar (7) that extends in a plane perpendicular to an axis of said button and on which said ribs (6) are seated, said circular collar (7) forming a stop at a lower edge of the eyelet (4).

18. The ear loop according to claim 17, wherein the eyelet (4) at least partially covers the collar (7) and said at least one rib (6).

\* \* \* \* \*